(12) United States Patent
Ghamsari et al.

(10) Patent No.: US 11,875,401 B2
(45) Date of Patent: *Jan. 16, 2024

(54) METHODS AND SYSTEMS FOR PROVIDING PERSONALIZED PURCHASING INFORMATION

(71) Applicant: Capital One Services, LLC, McLean, VA (US)

(72) Inventors: Avid Ghamsari, Austin, TX (US); Staevan Duckworth, Oak Point, TX (US); Geoffrey Dagley, McKinney, TX (US); Micah Price, Plano, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/453,058

(22) Filed: Nov. 1, 2021

(65) Prior Publication Data

US 2022/0051317 A1 Feb. 17, 2022

Related U.S. Application Data

(63) Continuation of application No. 16/695,387, filed on Nov. 26, 2019, now Pat. No. 11,164,246.

(51) Int. Cl.
| | |
|---|---|
| *G06Q 40/03* | (2023.01) |
| *G06Q 20/10* | (2012.01) |
| *G06Q 40/08* | (2012.01) |
| *G06Q 30/0601* | (2023.01) |
| *G06Q 40/04* | (2012.01) |

(Continued)

(52) U.S. Cl.
CPC ............. *G06Q 40/03* (2023.01); *G06Q 20/10* (2013.01); *G06Q 30/02* (2013.01); *G06Q 30/0601* (2013.01); *G06Q 40/04* (2013.01); *G06Q 40/08* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 8,412,593 B1 * | 4/2013 | Song | G06Q 30/00 705/35 |
| 9,652,802 B1 | 5/2017 | Kasower | |

(Continued)

*Primary Examiner* — Namrata Boveja
*Assistant Examiner* — Amit Patel
(74) *Attorney, Agent, or Firm* — Bookoff McAndrews, PLLC (57) ABSTRACT

A computer-implemented method for providing personalized purchasing information to a user may include: obtaining first identification data of the user from a first engine; verifying a registration status of the user based on the first identification data; obtaining second identification data of the user from a second engine based on the registration status of the user; comparing the first identification data of the user and the second identification data of the user; initiating a real-time credit monitoring session based on the comparison between the first identification data of the user and the second identification data of the user; generating the personalized purchasing information of the user based on the real-time credit score of the user; and demonstrating the personalized purchasing information on a display of a device associated with the user.

20 Claims, 4 Drawing Sheets

(51) Int. Cl.
*G06Q 30/02* (2023.01)
*G06Q 40/02* (2023.01)

(56) References Cited

U.S. PATENT DOCUMENTS

| | | |
|---|---|---|
| 2006/0178983 A1 | 8/2006 | Nice et al. |
| 2010/0174638 A1 | 7/2010 | DeBie et al. |
| 2010/0325040 A1 | 12/2010 | Etchegoyen |
| 2012/0011245 A1 | 1/2012 | Gillette et al. |
| 2013/0179325 A1 | 7/2013 | Perlly |
| 2015/0193638 A1 | 7/2015 | Cook |
| 2016/0180428 A1 | 6/2016 | Cain et al. |

* cited by examiner

METHODS AND SYSTEMS FOR PROVIDING PERSONALIZED PURCHASING INFORMATION

CROSS-REFERENCE TO RELATED APPLICATION(S)

This patent application is a continuation of and claims the benefit of priority to U.S. Nonprovisional patent application Ser. No. 16/695,387, filed on Nov. 26, 2019, the entirety of which is incorporated herein by reference.

TECHNICAL FIELD

Various embodiments of the present disclosure relate generally to providing personalized purchasing information to a user, and, more particularly, to monitoring credit information of the user to generate such personalized purchasing information.

BACKGROUND

Prequalification is a process by which a user may be evaluated to determine the user's ability to qualify for a loan, and may result in the user being deemed "prequalified." Such a status traditionally expires after a certain period of time (e.g., 30 days). If a user wants to continue to apply loan after expiration of the certain period of time, he/she may have to repeat the prequalification process to once again be considered "prequalified," and potentially, to be able to view priced inventory based on the new prequalification. Additionally, a user may be deemed prequalified by one engine (e.g., one website) but may need to undergo an additional prequalification process so as to be deemed prequalified by another engine (e.g., another website), although these two engines may be associated with one another. Moreover, after a user obtains a prequalified status, the user may not be able to see priced inventory immediately. Instead, the user may still need to set up one or more filters or make one or more selections before being presented with the priced inventory.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing personalized purchasing information to a user.

In an aspect, a computer-implemented method for providing personalized purchasing information to a user may include: obtaining, via one or more processors, first identification data of the user from a first engine, wherein the first identification data includes at least one of a first user name, a first address, a first income range, or a first social security number of the user reported by the first engine; verifying, via the one or more processors, a registration status of the user based on the first identification data; obtaining, via the one or more processors, second identification data of the user from a second engine based on the registration status of the user, wherein the second identification data of the user includes at least one of a second user name or a second social security number of the user reported by the second engine; comparing, via the one or more processors, the first identification data of the user and the second identification data of the user; initiating, via the one or more processors, a real-time credit monitoring session based on the comparison between the first identification data of the user and the second identification data of the user, wherein the real-time credit monitoring session generates a real-time credit score of the user; generating, via the one or more processors, the personalized purchasing information of the user based on the real-time credit score of the user; and demonstrating the personalized purchasing information on a display of a device associated with the user.

In another aspect, a computer-implemented method for providing personalized purchasing information to a user may include: obtaining, via one or more processors, first identification data of the user from a first engine, wherein the first identification data includes at least one of a first user name, a first address, a first income range, or a first social security number of the user reported by the first engine; verifying, via the one or more processors, a registration status of the user based on the first identification data; initiating, via the one or more processors, a periodic credit monitoring session based on the registration status of the user, wherein the periodic credit monitoring session collects one or more periodic credit scores of the user over a predetermined period; obtaining, via the one or more processors, second identification data of the user from a second engine based on the registration status of the user, wherein the second identification data of the user includes at least one of a second user name or a second social security number of the user reported by the second engine; comparing, via the one or more processors, the first identification data of the user and the second identification data of the user, wherein the comparing includes comparing at least the first user name and the second user name; determining, via the one or more processors, a real-time credit score of the user based on the comparison between the first identification data of the user and the second identification data of the user, wherein the real-time credit score is one of the one or more periodic credit scores; generating, via the one or more processors, the personalized purchasing information of the user based on the real-time credit score of the user; and demonstrating the personalized purchasing information on a display of a device associated with the user.

In yet another aspect, a computer system for providing personalized purchasing information to a user may include a memory storing instructions; and one or more processors configured to execute the instructions to perform operations. The operations may include: obtaining first identification data of the user via a first engine, wherein the first identification data includes at least one of a first user name, a first address, a first income range, or a first social security number of the user reported by the first engine; verifying a registration status of the user based on the first identification data; obtaining second identification data of the user from a second engine based on the registration status of the user, wherein the second identification data of the user includes at least one of a second user name or a second social security number of the user reported by the second engine; comparing the first identification data of the user and the second identification data of the user; initiating a real-time credit monitoring session based on the comparison between the first identification data of the user and the second identification data of the user, wherein the real-time credit monitoring session generates a real-time credit score of the user; generating the personalized purchasing information to the user based on the real-time credit score of the user; and demonstrating the personalized purchasing information on a display of a device associated with the user.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as first identification data, second identification data, or credit information (e.g., periodic credit score, or real-time credit score) may be used to generate personalized purchasing information.

Figure 1:
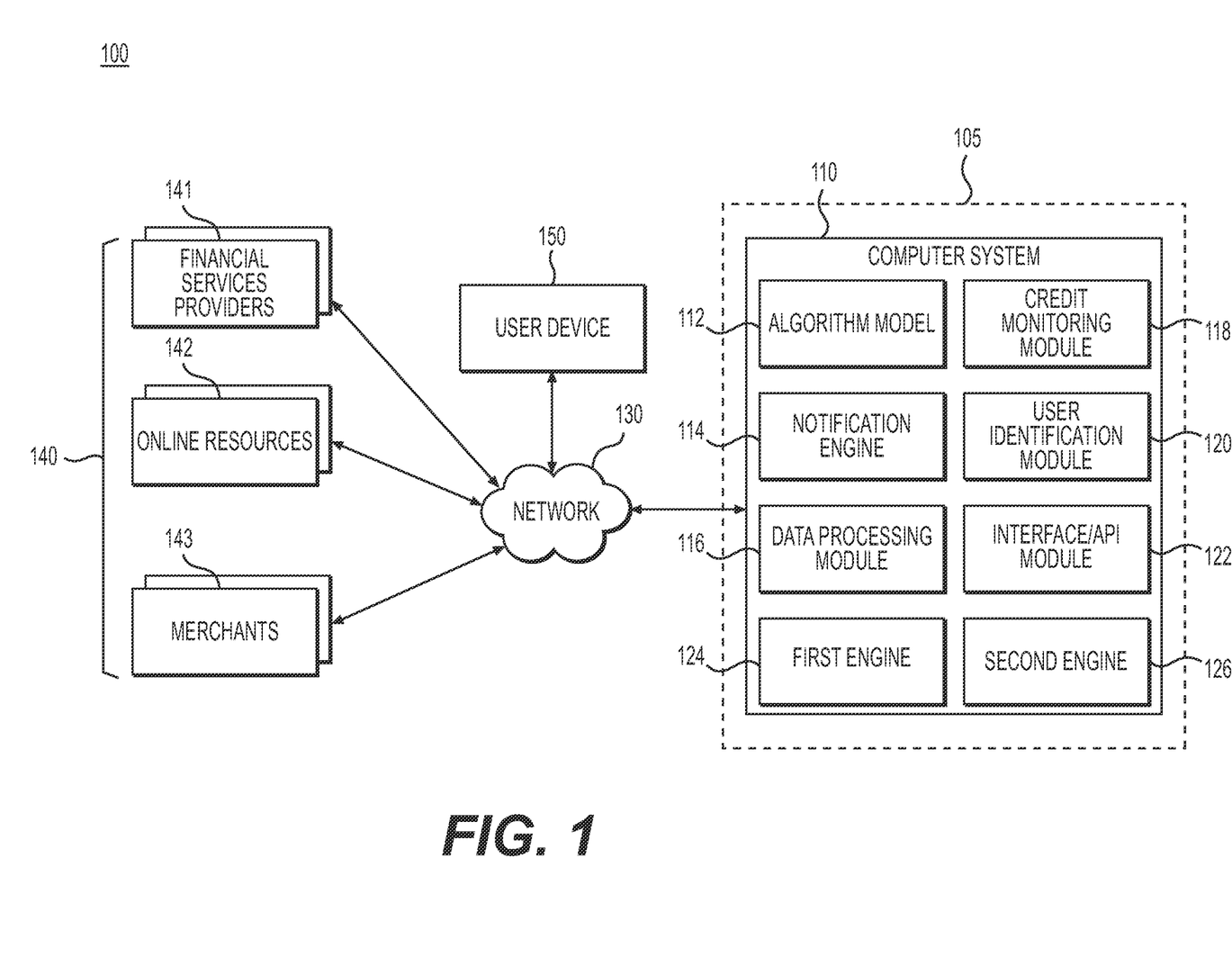
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, a network 130, one or more resources for collecting data (e.g., first identification data, second identification data) 140, and a user device 150. The one or more resources for collecting data 140 may include financial services providers 141, online resources 142, and merchants 143. These components may be in communication with one another via the network 130.

The computer system 110 may have one or more processors configured to perform methods described in this disclosure. The computer system 110 may include one or more modules, models, or engines. The one or more modules, models, or engines may include an algorithm model 112, a notification engine 114, a data processing module 116, a credit monitoring module 118, a user identification module 120, an interface/API module 122, a first engine 124, and/or a second engine 126, which may each be software components stored in the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include a trained machine learning model (or a machine learning model). Details of algorithm model 112 are described elsewhere herein. The notification engine 114 may be configured to generate and communicate (e.g., transmit) one or more notifications to user device 150 through the network 130. The one or more notifications may include personalized purchasing information. The data processing module 116 may be configured to monitor, track, clean, process, or standardize data (e.g., first identification data) received by the computer system 110. One or more algorithms may be used to clean, process, or standardize the data. The credit monitoring module 118 may be configured to monitor or track periodic or real-time credit information (e.g., credit scores) or transaction/purchasing information of the user. The credit monitoring module 118 may retrieve, store, and otherwise aggregate or manage current or historical credit information or transaction/purchasing information from one or more resources 140. The user identification module 120 may manage identification data (e.g., first identification data, second identification data) for each user accessing the computer system 110, possibly including, but not limited to, user names, passwords, contact information, social security numbers, or any additional information pertaining to each user accessing the computer system 110. The identification data may further include user preference information, demographic information, previous purchase information, and other data related to a particular user. In one implementation, the identification data associated with each user may be stored to, and retrieved from, the one or more resources 140 or one or more components of a data storage associated with the computer system 110. The interface/API module 122 may allow the user or merchant (e.g., merchants 143) to interact with one or more modules, models, or engines of the computer system 110. The first engine 124 and/or the second engine 126 may be associated with the one or more resources for collecting data 140. Details of the first engine 124 and the second engine 126 are described elsewhere herein.

Computer system 110 may be configured to receive data from other components (e.g., financial services providers 141, online resources 142, merchants 143, and/or user device 150) of the system environment 100 through network 130. Computer system 110 may further be configured to utilize the received data by inputting the received data into the algorithm model 112 to produce a result. Information indicating the result (e.g., personalized purchasing information) may be transmitted to user device 150 over the network 130. In some examples, the computer system 110 may be referred to as a server system that provides a service including providing the information indicating the result to user device 150.

Network 130 may be any suitable network or combination of networks and may support any appropriate protocol suitable for communication of data to and from the computer system 110. Network 130 may include a public network (e.g., the Internet), a private network (e.g., a network within an organization), or a combination of public and/or private networks. The network 130 may include one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that enables communication between one or more components of the network layout. In some embodiments, the network 130 may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some embodiments, financial services providers 141 may include one or more credit monitoring agencies or one or more loan prequalifying agencies. In some examples, financial services providers 141 may include one or more merchant services providers that provide merchants 143 with the ability to accept electronic payments, such as payments using credit cards and debit cards. Therefore, financial services providers 141 may collect and store credit information, transaction/purchasing information, and/or user instructions. The financial services providers 141 may be associated with the first engine 124 and/or the second engine 126. In this situation, the first engine 124 and/or the second engine 126 may retrieve or gather data from the financial service providers 141, and transmit or report the data to other modules, models, or engines of the computer system 110.

Online resources 142 may include webpages, e-mail, apps, or social network sites. Online resources 142 may be provided by financial service providers (e.g., financial service providers 141), manufacturers, retailers (e.g., merchants 143), and other entities. Online resources 142 may include other computer systems, such as web servers, that are accessible by computer system 110. The online resources 142 may be configured to provide any information regarding a user or personalized purchasing information of the user. The online resources 142 may be associated with the first engine 124 and/or the second engine 126. In this situation, the first engine 124 or the second engine 126 may retrieve or gather data from the online resources 142, and transmit or report the data to other modules, models, or engines of the computer system 110.

Merchants 143 may each be an entity that provides products. In this disclosure, the term "product," in the context of products offered by a merchant, encompasses both goods and services, as well as products that are a combination of goods and services. In some embodiments, the product may be a vehicle. A merchant may be, for example, a vehicle dealer, a retailer, a grocery store, an entertainment venue, a service provider, a restaurant, a bar or other type of entity that provides products that a consumer or a user may consume. The merchants 143 may be associated with the first engine 124 and/or the second engine 126. In this situation, the first engine 124 and/or the second engine 126 may retrieve or gather data from the merchants 143, and transmit or report the data to other modules, models, or engines of the computer system 110.

The merchants 143 and financial services providers 141 may each include one or more computer systems configured to gather, process, transmit, and/or receive data. In general, whenever any of the merchants 143 and financial services providers 141 is described as performing an operation of gathering, processing, transmitting, or receiving data, it is understood that such operation may be performed by a computer system thereof. In general, a computer system may include one or more computing devices, as described in connection with FIG. 4 below.

User device 150 (or a device associated with the user) may operate a client program, also referred to as a user application, used to communicate with the computer system 110. This user application may be used to provide information to the computer system 110 and to receive information from the computer system 110. User device 150 may be associated with interface/API module 122 of computer system 110. In some examples, the user application may be a mobile application that is run on the user device 150. User device 150 may be an electronic mobile device (e.g., smartphone, tablet, pager, personal digital assistant (PDA)), a computer (e.g., laptop computer, desktop computer, server), or a wearable device (e.g., smartwatches). User device 150 can also include any other device capable of providing or rendering data. User device 150 may optionally be portable. User device 150 may be handheld. User device 150 may be a network device capable of connecting to a network, such as the network 130, or other networks such as a local area network (LAN), wide area network (WAN) such as the Internet, a telecommunications network, a data network, or any other type of network. User device 150 may be utilized to obtain identification of the user and/or authenticate the user.

Computer system 110 may be part of entity 105, which may be any type of company, organization, or institution. In some examples, the entity 105 may be a financial services provider (e.g., financial services provider 141). In such examples, the computer system 110 may have access to data pertaining to consumer transactions through a private network within the entity 105. For example, if the entity 105 is a card issuer, entity 105 may collect and store identification data or credit information involving a credit card or debit card issued by the entity 105. In such examples, the computer system 110 may still receive identification data or credit information from other financial services providers 141.

Figure 2:
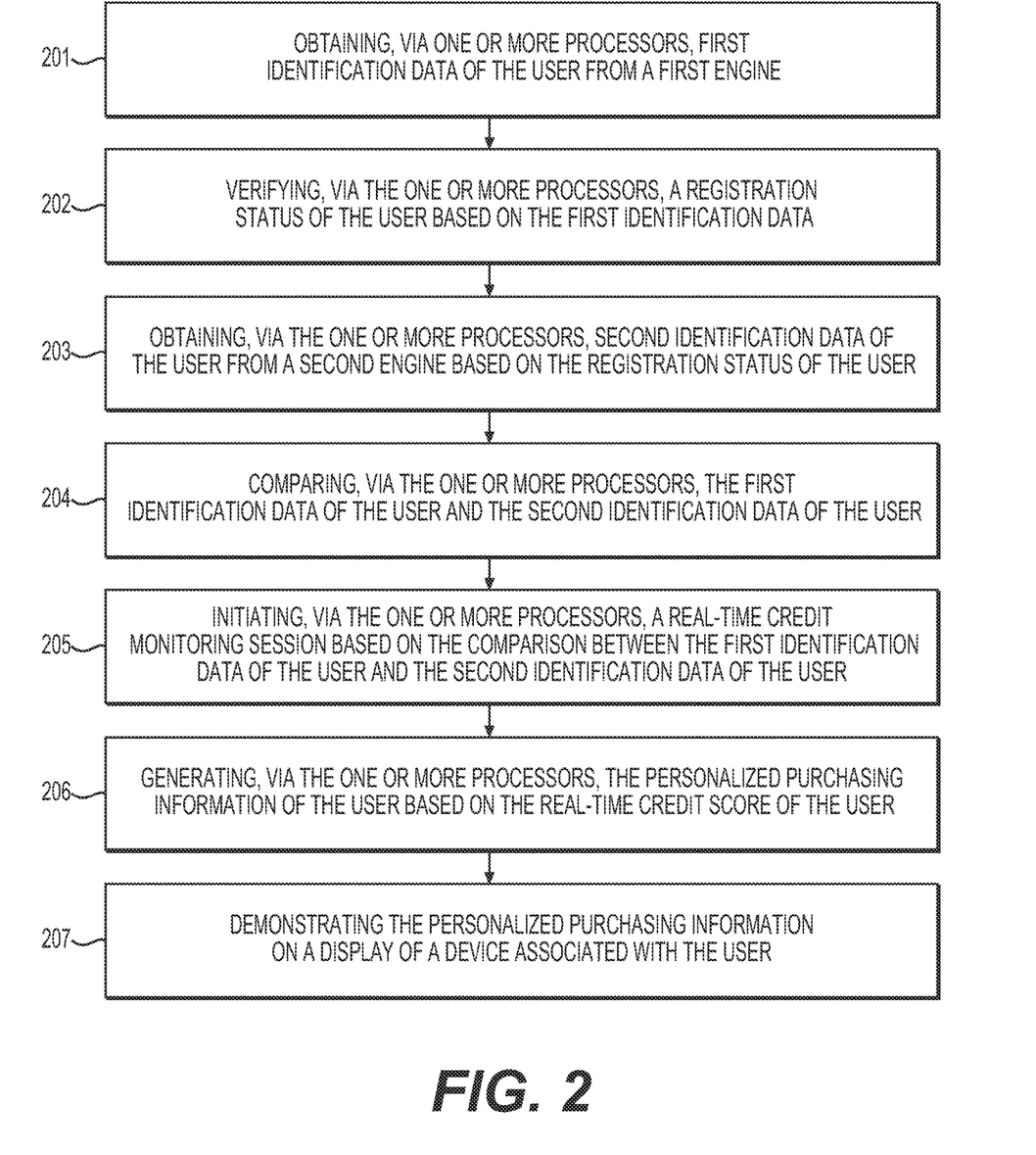
FIG. 2 depicts a flowchart of an exemplary method of providing personalized purchasing information to a user, according to one or more embodiments.

FIG. 2 is a flowchart illustrating a method for providing personalized purchasing information to a user, according to one or more embodiments of the present disclosure. The method may be performed by computer system 110.

Step 201 may include obtaining, via one or more processors, first identification data of the user from a first engine. The first identification data may include at least one of a first user name, a first address, a first income range, or a first social security number of the user reported by the first engine 124. The first identification data also may include any biometric data of the user reported by the first engine 124. The biometric data of the user may include any information related to human characteristics of the user. The biometric data may include physiological information such as a fingerprint, palm veins, face recognition, DNA, palm print, hand geometry, iris recognition, retina and odor/scent. The biometric data may also include behavioral characteristics related to the pattern of behavior of the user, including but not limited to typing rhythm, gait, and voice. The first identification data of the user may further include any information pertaining to the user reported by the first engine 124, including, but not limited to, an actual name, passwords, any contact information (e.g., address, phone numbers, e-mail addresses, etc.), and additional information pertaining to the user. The additional information may include user preference information, demographic information (e.g., age, gender, marital status, income level, educational background, number of children in household, etc.), employment, and other data related to the user.

As noted above, the first identification data may be reported by the first engine 124. The first engine 124 may be associated with one or more user interfaces (e.g., a website) that can interact with the user to collect first identification data of the user. The first engine 124 may gather the first identification data from the user via one or more interactive activities of the user with the one or more user interfaces displayed on the device associated with the user (e.g., user device 150). For instance, the user may type his/her user name, address, or social security number via a keyboard provided on the display of the device associated with the user. In another example, the user may click on one or more selections displayed on a display of the user device. The one or more selections may be in a form of a link, button, or hyperlink.

The first engine 124 may be associated with one or more credit monitoring agencies. The one or more credit monitoring agencies may include any financial services provider (e.g., financial services providers 141) that monitors user's credit information (e.g., credit scores), including, but not limited to, Identity Guard®, LifeLock®, IdentityForce®, Experian®, TransUnion®, or Equifax®. The first identification data may be stored in one or more databases of the one or more credit monitoring agencies. The one or more databases may be one or more memory devices configured to store identification data (e.g., the first identification data). The one or more databases may be implemented as a computer system with a storage device. The one or more databases may be used by components of the environment 100 to perform one or more operations consistent with the disclosed embodiments. The one or more the databases may be located with one or more servers associated with one or more sources 140, and/or located with one another via the network 130.

Step 202 may include verifying, via the one or more processors, a registration status of the user based on the first identification data. The verifying the registration status of the user may include analyzing the first identification data of the user. The analyzing the first identification data of the user may be performed by user identification module 120 of the computer system 110. The user identification module 120 may analyze first identification data for each user accessing the computer system 110. The analyzing the first identification data of the user may include comparing the first identification data of the user to prestored identification data. One or more algorithms may be used to compare the first identification data of the user to prestored identification data and determine whether there is a match between the first identification data of the user and the prestored identification data. The registration status may be verified, or the verifying process may include additional processes to occur, based on whether there is a match (e.g., a complete match or a match equal to or exceeding a predetermined threshold of similarity) between the first identification data of the user and the prestored identification data. The registration status may represent whether the user is registered to access any information associated with the first engine 124 or the one or more credit monitoring agencies. The registration status of the user may include a registered customer status or a non-registered customer status. The registered customer status may include a new customer status or a returned customer status. The registered customer status may enable the user or one or more processors to access any information associated with the first engine 124 or one or more credit monitoring agencies. The non-registered customer status may not enable (e.g., prevent, block, inhibit, decline) the user or one or more processors to access any information associated with the first engine 124 or one or more credit monitoring agencies.

The prestored identification data may be generated when a user or a user device (e.g., user device 150) is registered with one or more sources 140, a transaction system, or an authentication system. In other embodiments, the prestored identification data may be generated when a user device (e.g., user device 150) first connects with one or more sources 140, a transaction system, or an authentication system. If the user device 150 is an electronic mobile device, the prestored identification data may be generated when a mobile application for authenticating identification is downloaded, installed, or running on the user device for the first time. The prestored identification data may be generated when a user account is registered with one or more sources 140, a transaction system, or an authentication system, and the prestored identification may correspond to the user device used for registration of the user account. Once the prestored identification data has been generated, it may be stored with other user account information and/or verification information. The prestored identification data may be stored in one or more memory units, cookies, caches, browsing histories, and/or browser fingerprints, associated with the first engine 124. The prestored identification data may be stored in a memory on-board the user device. The prestored identification data may be distributed over multiple devices or systems (e.g., peer-to-peer, cloud-computing based infrastructure, between the reader and an external device).

Step 203 may include obtaining, via the one or more processors, second identification data of the user from a second engine 126 based on the registration status of the user. The second identification data of the user may include at least one of a second user name or a second social security number of the user reported by the second engine 126. The second identification data may include any biometric data of the user reported by the second engine 126. The biometric data of the user may include any information related to human characteristics of the user. The biometric data may include physiological information such as a fingerprint, palm veins, face recognition, DNA, palm print, hand geometry, iris recognition, retina and odor/scent. The biometric data may also include behavioral characteristics related to the pattern of behavior of the user, including but not limited to typing rhythm, gait, and voice. The second identification data of the user may further include an actual name, passwords, any contact information (e.g., address, phone numbers, e-mail addresses, etc.), and additional information pertaining to the user. The additional information may include user preference information, demographic information (e.g., age, gender, marital status, income level, educational background, number of children in household, etc.), employment, and other data related to the user.

The second identification data may be obtained when the registration status of the user shows that the user is a registered customer. For instance, if the user is verified to be a registered customer, the second identification data may be automatically obtained. The second identification data may be reported by the second engine 126. The second engine 126 may be associated with one or more user interfaces (e.g., a website) that can interact with the user to collect second identification data of the user. The second engine 126 may gather the second identification data from the user via one or more interactive activities of the user with the one or more user interfaces displayed on the device associated with the user (e.g., user device 150). For instance, the user may type his/her user name, address, or social security number via a keyboard provided on the display of the device associated with the user. In another example, the user may click on one or more selections displayed on a display of the user device 150. The one or more selections may be in a form of a link, button, or hyperlink.

The second engine 126 may be associated with one or more loan prequalifying agencies. The one or more loan prequalifying agencies may include any financial services provider (e.g., financial services providers 141) that prequalifies loans for users, including, but not limited to, a bank, a fund, or a company. The second identification data may be stored in one or more databases of the one or more loan prequalifying agencies. The one or more databases may be one or more memory devices configured to store identification data (e.g., the second identification data). The one or more databases may be implemented as a computer system with a storage device. The one or more databases may be used by components of the environment 100 to perform one or more operations consistent with the disclosed embodiments. The one or more the databases may be co-located with one or more servers associated with one or more sources 140, and/or co-located with one another via the network.

Step 204 may include comparing, via the one or more processors, the first identification data of the user and the second identification data of the user. The comparing the first identification data and the second identification data may include matching the first identification data with the second identification data. For instance, if the first identification data includes the first social security number and the second identification data includes the second social security number, comparing the first identification data and the second identification data may include comparing or matching the first social security number and the second social security number. In another example, if the first identification data includes the first user name and the second identification data includes the second user name, comparing the first identification data and the second identification data may include comparing and/or matching the first user name and the second user name.

Step 205 may include initiating, via the one or more processors, a real-time credit monitoring session based on the comparison between the first identification data of the user and the second identification data of the user. The initiating the real-time credit monitoring session may include initiating a real-time credit monitoring session based on a match (e.g., a complete match or a match equal to or exceeding a predetermined threshold of similarity) between the first identification data of the user and the second identification data of the user. In some embodiments, if the first identification data matches the second identification data, then the real-time credit monitoring session may be initiated. For instance, a first user name of the first identification data reported by the first engine 124 may be compared with a second user name of the second identification data reported by the second engine 126 to determine whether there is a user name match. In this situation, if there is a match between these two user names, then the real-time credit monitoring session may be initiated for the user.

The real-time credit monitoring session may generate a real-time credit score of the user. The real-time credit monitoring session may generate the real-time credit score of the user via a soft pull (or soft inquiry). Alternatively, in some embodiments, the real-time credit monitoring session may generate the real-time credit score of the user via any procedure, such as a hard pull (or hard inquiry). The real-time monitoring session may retrieve any other transactional information of the user. The transactional information of the user may include any information regarding a transaction associated with purchasing a product, for example, a user identifier, contact information (e.g., address, phone numbers, e-mail addresses, etc.), demographic information (e.g., age, gender, marital status, income level, educational background, number of children in household, etc.), user preferences (preferences or reviews regarding favorite products and/or services, favorite department stores, etc.), a transaction amount, and previous transaction information. The previous transaction information may include a time of a prior transaction, a location of a prior transaction, spending profile of a user, past spending levels on goods sold by various manufacturers or merchants, a frequency of shopping by the user at one or more merchants, how much the user spends in an average transaction, how much the user has spent on a particular product, how often the user shops in a particular store or kind of merchant, an estimated profit margin on goods previously purchased, or online or offline stores at which the user has purchased items.

Step 206 may include generating, via the one or more processors, personalized purchasing information of the user based on the real-time credit score of the user. The personalized purchasing information of the user may include at least a price range of purchasing a product or a prequalification status of purchasing the product. For example, the prequalification status may indicate whether the user is prequalified to purchase one or more products within a specified price range based on the real-time credit score of the user. If the user is prequalified to purchase one or more products within the specified price range, the personalized purchasing information may further include any information regarding the one or more products, including, but not limited to, images, reviews, or priced inventory of the one or more products. For example, the prequalification status may indicate that the user is prequalified to purchase a vehicle from \$20,000.00 to \$30,000.00 based on a credit score of 700. If the user is prequalified to purchase the vehicle, the personalized purchasing information may include one or more images and the price of the vehicle. The prequalification status may also show whether the user is prequalified to apply for financial cards (e.g., credit card) based on the real-time credit score of the user.

The personalized purchasing information of the user may also include any information regarding purchasing a product by the user, for example, a customer identifier, a recommended location to purchase the product, or a recommended time to purchase the product. The personalized purchasing information may include an annual percentage rate (APR) or loan interest rate of the user. The annual percentage rate or loan interest rate of the user may be based on, or associated with, vehicle prices, trade-in values, or dealer fees. The annual percentage rate or loan interest rate for each car may be determined based on information regarding the user (e.g., a real-time credit score). The personalized purchasing information may include safety or recall information regarding the product, upgrade or repair information specific to the product, possible substitute or compatible items for the products, and so forth. One or more algorithms may be used to generate the personalized purchasing information. The one or more algorithms may include a trained machine learning algorithm. Details of the one or more algorithms are described elsewhere herein. The product may include a vehicle. In some embodiments, the product may be any item (e.g., a property) or service (e.g., credit card application) provided by a merchant (e.g., merchant 143) or a financial services provider (e.g., financial services provider 141).

Step 207 may include demonstrating the personalized purchasing information on a display of a device associated with the user. The personalized purchasing information may be configured to be displayed on a display screen of a user device, e.g., user device 150. The personalized purchasing information may be displayed on the display screen in any suitable form, such as an e-mail, a text message, a push notification, content on a web page, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor input (e.g., an input device 450 as described in connection with FIG. 4, below).

At any stage of providing personalized purchasing information to a user, the method may further include storing the personalized purchasing information for subsequent analysis. The stored personalized purchasing information may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the personalized purchasing information to update the first identification data, the second identification data, or the credit information (e.g., credit score) of the user. The personalized purchasing information may also be one of the one or more variables used in training a trained machine learning model. Details of the trained machine learning model are described elsewhere herein.

Figure 3:
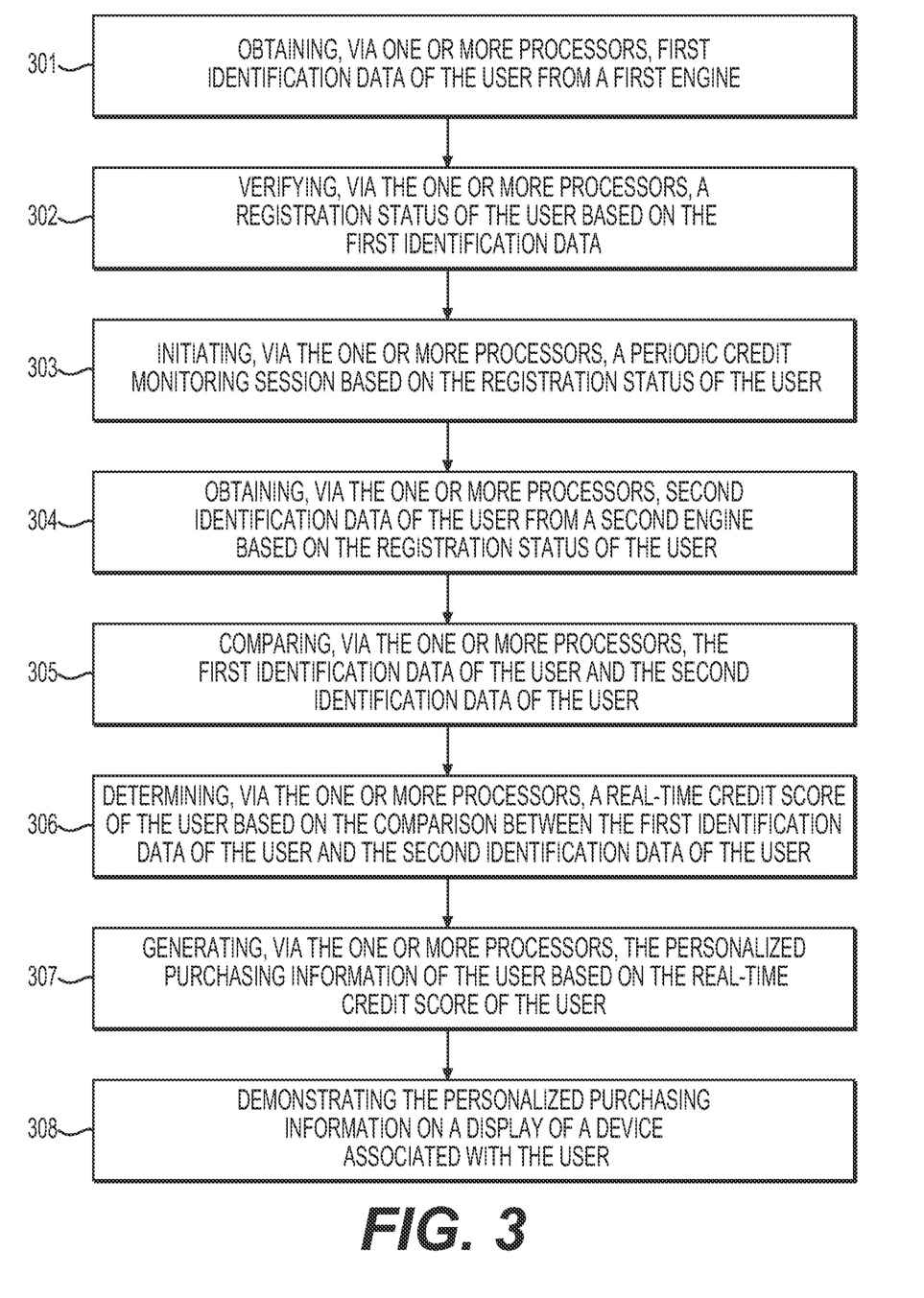
FIG. 3 depicts a flowchart of another exemplary method of providing personalized purchasing information to a user, according to one or more embodiments.

FIG. 3 is a flowchart illustrating another exemplary method for providing personalized purchasing information to a user, according to one or more embodiments of the present disclosure. The method may be performed by computer system 110.

Step 301, similarly to step 201 of FIG. 2, may include obtaining, via one or more processors, first identification data of the user from a first engine 124. The first identification data may include at least one of a first user name, a first address, a first income range, or a first social security number of the user reported by the first engine 124. Details of the first identification data are described elsewhere herein. The first engine 124 may be associated with one or more credit monitoring agencies. The one or more credit monitoring agencies may include any financial services provider that monitors user's credit scores, including, but not limited to, Identity Guard®, LifeLock®, IdentityForce®, Experian®, TransUnion®, or Equifax®. The first identification data may be stored in one or more databases of the one or more credit monitoring agencies.

Step 302, similarly to step 202 of FIG. 2, may include verifying, via the one or more processors, a registration status of the user based on the first identification data. The registration status of the user may include a registered customer status or a non-registered customer status. The registered customer status may include a new customer status or a returned customer status. The registered customer status may enable the user or one or more processors to access any information associated with the first engine 124 or one or more credit monitoring agencies. The non-registered customer status may not enable (e.g., prevent, block, inhibit, decline) the user or one or more processors to access any information associated with the first engine 124 or one or more credit monitoring agencies. Optionally, the method may additionally include a step of transmitting a registration status to the device associated with the user (e.g., user device 150); and a step of receiving a secondary verification from the device associated with the user (e.g., user device 150). A secondary verification request may be presented to the user via a third-party application displayed on the user device 150. The secondary verification may be provided by the user via one or more interactive activities of the user with the device associated with the user (e.g., user device 150). Details of the one or more interactive activities are described elsewhere herein.

Step 303 may include initiating, via the one or more processors, a periodic credit monitoring session based on the registration status of the user. The periodic credit monitoring session may be initiated when the registration status of the user indicates that the user is a registered customer. For instance, if the user is verified to be a registered customer, the periodic credit monitoring session may be automatically initiated (e.g., without further human interaction). The periodic credit monitoring session may collect periodic credit information (e.g., periodic credit scores) of the user over a predetermined period of time. The predetermined period of time may be at least one day, one week, one month, one quarter, one year, or longer. In some embodiments, the predetermined period of time may be at most one year, one quarter, one month, one week, one day, or shorter.

The periodic credit monitoring session may collect the one or more periodic credit scores of the user via a soft pull (e.g., a soft inquiry). Alternatively, in some embodiments, the periodic credit monitoring session may generate the periodic credit score of the user via any procedure, such as a hard pull (e.g., hard inquiry). The periodic monitoring session may retrieve any other transactional information of the user. The transactional information of the user may include any information regarding a transaction associated with purchasing a product, for example, a customer identifier, contact information (e.g., address, phone numbers, e-mail addresses, etc.), demographic information (e.g., age, gender, marital status, income level, educational background, number of children in household, etc.), user preferences (preferences or reviews regarding favorite products and/or services, favorite department stores, etc.), a transaction amount, and previous transaction information. The previous transaction information may include a time of a prior transaction, a location of a prior transaction, spending profile of a user, past spending levels on goods sold by various manufacturers or merchants, a frequency of shopping by the user at one or more merchants, how much the user spends in an average transaction, how much the user has spent on a particular product, how often the user shops in a particular store or kind of merchant, an estimated profit margin on goods previously purchased, or online or offline stores at which the user has purchased items.

Step 304, similarly to step 203 of FIG. 2, may include obtaining, via the one or more processors, second identification data of the user from a second engine 126 based on the registration status of the user. The second identification data of the user may include at least one of a second user name or a second social security number of the user reported by the second engine 126. Details of the second identification data are described elsewhere herein. The second engine 126 may be associated with one or more loan prequalifying agencies. The one or more loan prequalifying agencies may include any financial institutions that prequalifies loans for users, including, but not limited to, a bank, a fund, or a company. The second identification data may be stored in one or more databases of the one or more loan prequalifying agencies.

Step 305, similar to step 204 of FIG. 2, may include comparing, via the one or more processors, the first identification data of the user and the second identification data of the user. The comparing the first identification data and the second identification data may include matching the first identification data with the second identification data. For instance, if the first identification data includes the first user name and the second identification data includes the second user name, comparing the first identification data and the second identification data may include comparing and/or matching the first user name and the second user name. In another example, if the first identification data includes the first social security number and the second identification data includes the second social security number, comparing the first identification data and the second identification data may include comparing or matching the first social security number and the second social security number. In yet another example, if the first identification data includes the first address and the second identification data includes the second address, comparing the first identification data and the second identification data may include comparing or matching the first address and the second address.

Step 306 may include determining, via the one or more processors, a real-time credit score of the user based on the comparison between the first identification data of the user and the second identification data of the user. The determining a real-time credit score may include determining a real-time credit score based on a match (e.g., a complete match or a match equal to or exceeding a predetermined threshold of similarity) between the first identification data of the user and the second identification data of the user. In some embodiments, if the first identification data matches the second identification data, then the real-time credit information (e.g., credit score) may be determined. For instance, a first user name of the first identification data reported by the first engine 124 may be compared with a second user name of the second identification data reported by the second engine 126 to see whether there is a match. In this situation, if there is a match between these two user names, then the real-time credit information (e.g., credit score) may be determined.

The real-time credit score may be one of the one or more periodic credit scores. For instance, once the registration status of the user is verified, a periodic credit monitoring session may be initiated and the credit scores of the user may be collected every week via a soft pull. In this situation, if the user connects to the second engine 126 (e.g., the user interacts with one or more user interfaces (e.g., a website) associated with the second engine) at a certain time, and if the second identification data obtained from the second engine 126 matches the first identification data obtained from the first engine 124, then a real-time credit score may be obtained and the real-time credit score may be the periodic credit score collected within a week of the certain time. The real-time credit score may be an average credit score of the one or more periodic credit scores. For instance, once the registration status of the user is verified, a periodic credit monitoring session may be initiated and the periodic credit scores of the user may be collected every week via a soft pull. In this situation, if the user connects to the second engine 126 (e.g., the user interacts with one or more user interfaces (e.g., a website) associated with the second engine) at a certain time, and if the second identification data obtained from the second engine 126 matches the first identification data obtained from the first engine 124, then a real-time credit score may be obtained and the real-time credit score may be an average credit score within a period of one quarter of the certain time.

Step 307, similar to step 206 of FIG. 2, may include generating, via the one or more processors, the personalized purchasing information of the user based on the real-time credit score of the user. The personalized purchasing information of the user may include at least a price range of purchasing a product or a prequalification status of purchasing the product. For example, the prequalification status may indicate whether the user is prequalified to purchase one or more products within a specified price range based on the real-time credit score of the user. If the user is prequalified to purchase one or more products within the specified price range, the personalized purchasing information may further include any information regarding the one or more products, including, but not limited to, images, reviews, or priced inventory of the one or more products. For example, the prequalification status may indicate that the user is prequalified to purchase a vehicle from $20,000.00 to $30,000.00 based on a credit score of 700. If the user is prequalified to purchase the vehicle, the personalized purchasing information may include one or more images and the price of the vehicle. The prequalification status may also show whether the user is prequalified to apply for financial cards (e.g., credit card) based on the real-time credit score of the user.

The personalized purchasing information of the user may also include any information regarding purchasing a product by the user, for example, a customer identifier, a recommended location to purchase the product, or a recommended time to purchase the product. The personalized purchasing information may include an annual percentage rate or loan interest rate of the user. The annual percentage rate or loan interest rate of the user may be based on, or associated with, vehicle prices, trade-in values, or dealer fees. The annual percentage rate or loan interest rate for each car may be determined based on information regarding the user (e.g., real-time credit score). The personalized purchasing information may include safety or recall information regarding the product, upgrade or repair information specific to the product, possible substitute or compatible items for the products, and so forth. One or more algorithms may be used to generating the personalized purchasing information. The one or more algorithms may include a trained machine learning algorithm. Details of the one or more algorithms are described elsewhere herein. The product may include a vehicle. In some embodiments, the product may be any item (e.g., a property) or service (e.g., credit card application) provided by a merchant or a financial services provider.

At any stage of providing personalized purchasing information to a user, the method may further include storing the personalized purchasing information for subsequent analysis. The stored personalized purchasing information may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the personalized purchasing information to update the first identification data, the second identification data, or the credit score of the user. The personalized purchasing information may also be one of the one or more variables used in training a trained machine learning model.

The machine learning model may be a regression-based model or classification model that accepts the data identified in any steps described above as input data. Regression models may predict a number (e.g., a user can afford a car worth up to $25,340). Classification models may predict a class (e.g., a user can afford an 'expensive' car defined as 35 k-50 k). The machine learning model may be of any suitable form, and may include, for example, a neural network, linear regression, logistic regression, support vector machines (SVM), naïve Bayes classifiers, or may include tree-based methods such as random forest or gradient boosting machines (GBM). A neural network may be software representing human neural system (e.g., cognitive system). A neural network may include a series of layers termed "neurons" or "nodes." A neural network may include an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The machine learning model may produce the personalized purchasing information as a function of the first identification data, the registration status, the periodic credit score, the second identification, the real-time credit score, or one or more variables indicated in the input data. The one or more variables may be derived from the first identification data, the registration status, the periodic credit score, the second identification, or the real-time credit score. This function may be learned by training the machine learning model with training sets.

The machine learning model may be trained by supervised, unsupervised, or semi-supervised learning using training sets comprising data of types similar to the type of data used as the model input. For example, the training set used to train the model may include any combination of the following: the first identification data of the user, the registration status of the user, the periodic credit score of the user, the second identification of the user, the real-time credit score of the user, the personalized purchasing information of the user, the first identification data of customers other than the user, the registration status of customers other than the user, the periodic credit score of customers other than the user, the second identification of customers other than the user, the real-time credit score of customers other than the user, or the personalized purchasing information of customers other than the user. Accordingly, the machine learning model may be trained to map input variables to a quantity or value of personalized purchasing information. The personalized purchasing information determined by the machine learning model may be used as an additional input variable.

Step 308, similar to step 207 of FIG. 2, may include demonstrating the personalized purchasing information on a display of a device associated with the user. The personalized purchasing information may be configured to be displayed on a display screen of a user device, e.g., user device 150. The personalized purchasing information may be displayed on the display screen in any suitable form, such as an e-mail, a text message, a push notification, content on a web page, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor input (e.g., an input device 450 as described in connection with FIG. 4, below).

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110 and/or user device 150, may include one or more computing devices. If the one or more processors of the computer system 110 and/or user device 150 are implemented as a plurality of processors, the plurality of processors may be included in a single computing device or distributed among a plurality of computing devices. If a computer system 110 and/or user device 150 includes a plurality of computing devices, the memory of the computer system 110 may include the respective memory of each computing device of the plurality of computing devices.

Figure 4:
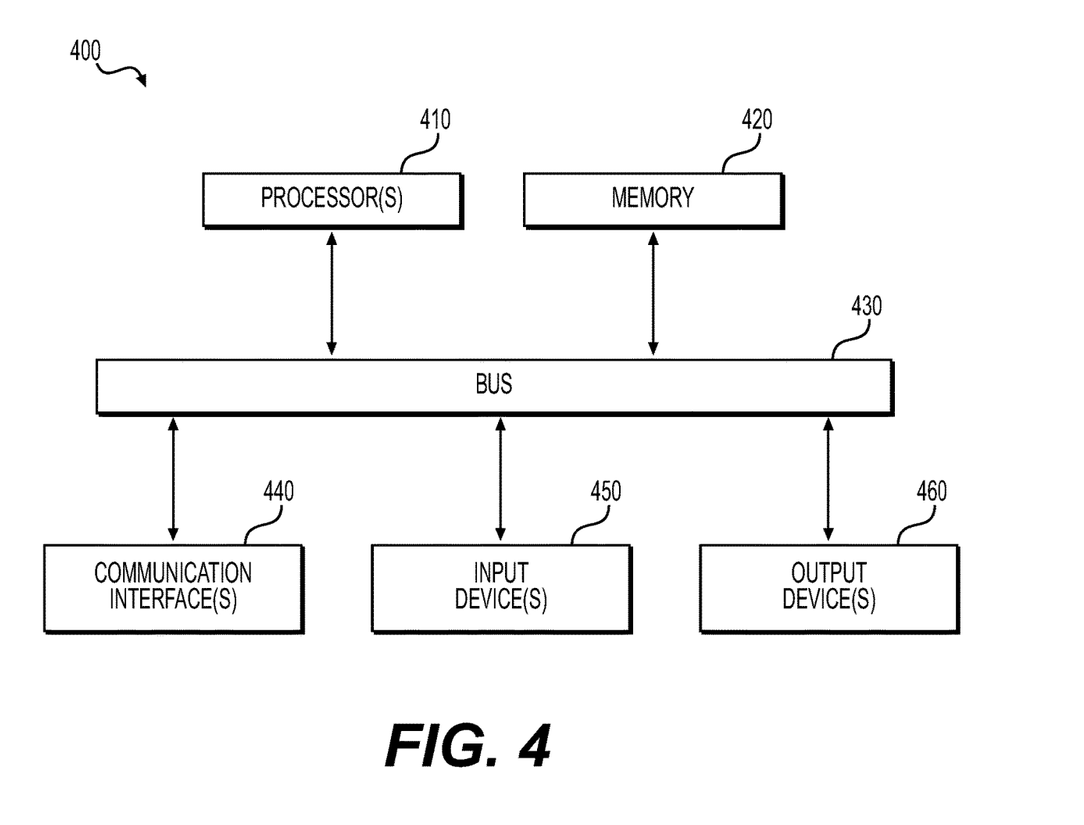
FIG. 4 depicts an example of a computing device, according to one or more embodiments.

FIG. 4 illustrates an example of a computing device 400 of a computer system, such as computer system 110 and/or user device 150. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for providing personalized purchasing information to a user, the method comprising:
   receiving, via one or more processors, data indicative of an interaction between a user and a first engine;
   obtaining, via the one or more processors, first identification data of the user from the first engine;
   verifying, using the first identification data and via the one or more processors, a registration status of the user with a second engine;
   based on the registration status of the user with the second engine, obtaining credit information of the user;
   generating the personalized purchasing information of the user by inputting the credit information of the user into a trained machine learning model, wherein:
      the trained machine learning model has been trained, based on credit information of customers other than the user and on personalized purchasing information of the customers other than the user, to generate output that includes the personalized purchasing information of the user in response to an input of the credit information of the user;
      the personalized purchasing information generated by the machine learning model includes:
         a prequalification status of the user based on the credit information of the user; and
         a purchasing recommendation for the user based on the prequalification status of the user, the purchasing recommendation including a priced financing option for one or more products, the priced financing option requiring the prequalification status in order to be priced for the user;
   generating a web page that is specific to the user and that includes the personalized purchasing information generated by the trained machine learning model; and
   causing, via the first engine, a display of a device associated with the user to display the generated web page, such that the personalized purchasing information is provided in response to the interaction between the user and the first engine.

2. The computer-implemented method of claim 1, wherein verifying the registration status of the user with the second engine includes comparing the first identification data of the user from the first engine with second identification data of the user from the second engine.

3. The computer-implemented method of claim 1, wherein obtaining the credit information of the user includes obtaining, via the second engine, a most-recent periodic credit score of the user.

4. The computer-implemented method of claim 1, wherein obtaining the credit information of the user includes:
   initiating, via the second engine, a real-time credit monitoring session for the user; and
   generating a real-time credit score for the user based on the real-time credit monitoring session.

5. The computer-implemented method of claim 1, further comprising:
   receiving further data indicative of further user interaction associated with the first engine via the device associated with the user, the further interaction associated with the personalized purchasing information included in the generated web page.

6. The computer-implemented method of claim 1, wherein the second engine is associated with one or more credit monitoring agencies.

7. The computer-implemented method of claim 1, wherein the first engine is associated with one or more loan prequalifying agencies.

8. The computer-implemented method of claim 1, wherein the personalized purchasing information of the user further includes at least one of an annual percentage rate, a loan interest rate, or a price range of purchasing a product of the one or more products.

9. The computer-implemented method of claim 1, wherein the one or more products include one or more vehicles.

10. The computer-implemented method of claim 1, wherein the interaction between the user and the first engine includes a search query by the user for a product of a same type as the one or more products.

11. A system for providing personalized purchasing information to a user, the system comprising:
at least one memory storing instructions and a trained machine learning model; and
at least one processor operatively connected to the at least one memory and configured to execute the instructions to perform operations, including:
receiving data indicative of an interaction between a user and a first engine;
obtaining first identification data of the user from the first engine;
verifying, using the first identification data, a registration status of the user with a second engine;
based on the registration status of the user with the second engine, obtaining credit information of the user;
generating the personalized purchasing information of the user by inputting the credit information of the user into the trained machine learning model, wherein:
the trained machine learning model has been trained, based on credit information of customers other than the user and on personalized purchasing information of the customers other than the user, to generate output that includes the personalized purchasing information of the user in response to an input of the credit information of the user;
the personalized purchasing information generated by the machine learning model includes:
a prequalification status of the user based on the credit information of the user; and
a purchasing recommendation for the user based on the prequalification status of the user, the purchasing recommendation including a priced financing option for one or more products, the priced financing option requiring the prequalification status in order to be priced for the user;
generating a web page that is specific to the user and that includes the personalized purchasing information generated by the trained machine learning model; and
causing, via the first engine, a display of a device associated with the user to display the generated web page, such that the personalized purchasing information is provided in response to the interaction between the user and the first engine.

12. The system of claim 11, wherein verifying the registration status of the user with the second engine includes comparing the first identification data of the user from the first engine with second identification data of the user from the second engine.

13. The system of claim 11, wherein obtaining the credit information of the user includes obtaining, via the second engine, a most-recent periodic credit score of the user.

14. The system of claim 11, wherein obtaining the credit information of the user includes:
initiating, via the second engine, a real-time credit monitoring session for the user; and
generating a real-time credit score for the user based on the real-time credit monitoring session.

15. The system of claim 11, wherein the operations further include:
receiving further data indicative of further user interaction associated with the first engine via the device associated with the user, the further interaction associated with the personalized purchasing information included in the generated web page.

16. The system of claim 11, wherein the second engine is associated with one or more credit monitoring agencies.

17. The system of claim 11, wherein the first engine is associated with one or more loan prequalifying agencies.

18. The system of claim 11, wherein:
the personalized purchasing information of the user further includes at least one of an annual percentage rate, a loan interest rate, or a price range of purchasing a product of the one or more products; and
the one or more products include one or more vehicles.

19. The system of claim 11, wherein the interaction between the user and the first engine includes a search query by the user for a product of a same type as the one or more products.

20. A non-transitory computer-readable medium storing instructions that, when executed by one or more processors, cause the one or more processors to perform a method for providing personalized purchasing information to a user, the method comprising:
receiving, via one or more processors, data indicative of an interaction between a user and a first engine, the interaction including a search query by the user for a vehicle;
obtaining, via the one or more processors, first identification data of the user from the first engine associated with a loan prequalification entity;
verifying, using the first identification data and via the one or more processors, a registration status of the user with a second engine associated with a credit monitoring entity;
based on the registration status of the user with the second engine, obtaining credit information of the user;
generating the personalized purchasing information of the user by inputting the credit information of the user into a trained machine learning model, wherein:
the trained machine learning model has been trained, based on credit information of customers other than the user and on personalized purchasing information of the customers other than the user, to generate output that includes the personalized purchasing information of the user in response to an input of the credit information of the user;
the personalized purchasing information generated by the machine learning model includes:
a prequalification status of the user based on the credit information of the user; and
a purchasing recommendation for the user based on the prequalification status of the user, the purchasing recommendation including a priced financing option for one or more vehicles, the priced financing option requiring the prequalification status in order to be priced for the user;

generating a web page that is specific to the user and that includes the personalized purchasing information generated by the trained machine learning model; and causing, via the first engine, a display of a device associated with the user to display the generated web page, such that the personalized purchasing information is provided in response to the interaction between the user and the first engine.

* * * * *